United States Patent
Boese et al.

(10) Patent No.: US 7,689,019 B2
(45) Date of Patent: Mar. 30, 2010

(54) METHOD AND DEVICE FOR REGISTERING 2D PROJECTION IMAGES RELATIVE TO A 3D IMAGE DATA RECORD

(75) Inventors: Jan Boese, Eckental (DE); Norbert Rahn, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 965 days.

(21) Appl. No.: 11/437,089

(22) Filed: May 19, 2006

(65) Prior Publication Data
US 2006/0262970 A1 Nov. 23, 2006

(30) Foreign Application Priority Data
May 19, 2005 (DE) .................. 10 2005 023 167

(51) Int. Cl.
*G06K 9/00* (2006.01)
(52) U.S. Cl. ............... 382/128; 382/131; 382/132; 382/154; 128/922; 600/424; 600/428; 600/407
(58) Field of Classification Search ............. 382/128, 382/131, 132, 154; 600/407, 424, 428
See application file for complete search history.

(56) References Cited

U.S. PATENT DOCUMENTS

| | | | | |
|---|---|---|---|---|
| 6,047,080 A | * | 4/2000 | Chen et al. | 382/128 |
| 6,628,977 B2 | * | 9/2003 | Graumann et al. | 600/407 |
| 2003/0013966 A1 | | 1/2003 | Barnes et al. | |
| 2003/0181809 A1 | * | 9/2003 | Hall et al. | 600/425 |
| 2003/0220555 A1 | | 11/2003 | Heigl et al. | |
| 2004/0077942 A1 | * | 4/2004 | Hall et al. | 600/428 |
| 2004/0170311 A1 | | 9/2004 | Accomazzi | |
| 2005/0004449 A1 | * | 1/2005 | Mitschke et al. | 600/424 |

FOREIGN PATENT DOCUMENTS

DE 102 01 644 A1 8/2003

OTHER PUBLICATIONS

J. Weese, T.M. Buzug, G.P. Penney and P. Desmedt, "2D/3D Registration and Motion Tracking for Surgical Interventions", Philips Journal of Research, 1998, pp. 299-316, vol. 51, No. 2.
Paieon Medical Ltd.; [Retrieved from internet on] Jul. 25, 2006; [Retrieved from internet at] http://www.matimop.org.il/newrdinf/company/c5292.htm; pp. 1-2; Rosh Haaiyn, Israel.

* cited by examiner

*Primary Examiner*—Tom Y Lu

(57) ABSTRACT

The invention relates to a method and a device for registering 2D projection images of an object relative to a 3D image data record of the same object, in which, from just a few 2D projection images, a 3D feature contained in an object, which is also identifiable in the 3D images, is symbolically reconstructed. The 3D feature obtained in this way is then registered by 3D-3D registration with the 3D image data record.

20 Claims, 2 Drawing Sheets

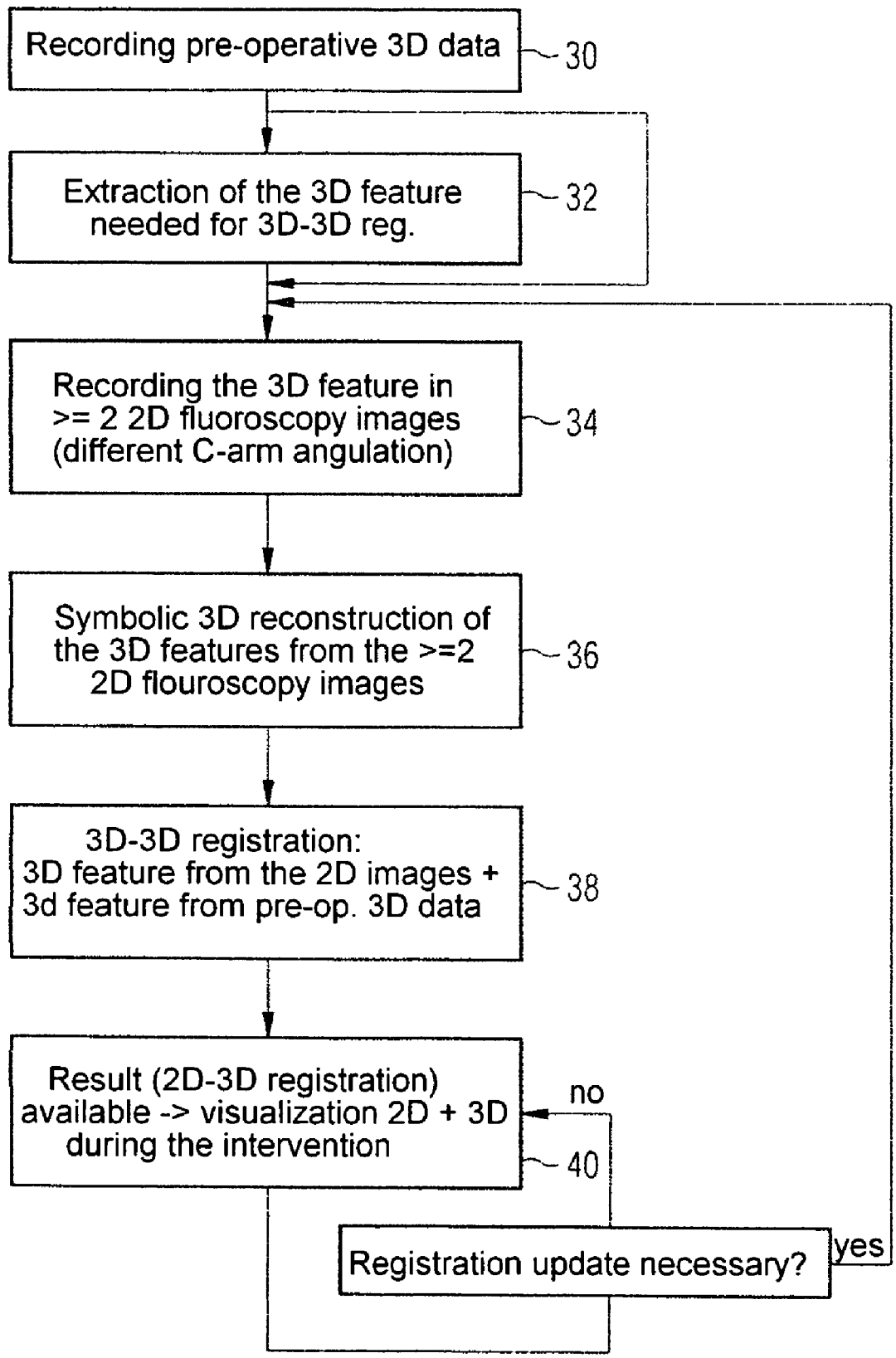

METHOD AND DEVICE FOR REGISTERING 2D PROJECTION IMAGES RELATIVE TO A 3D IMAGE DATA RECORD

CROSS REFERENCE TO RELATED APPLICATIONS

This application claims priority of German application No. 10 2005 023 167.5 filed May 19, 2005, which is incorporated by reference herein in its entirety.

FIELD OF THE INVENTION

The invention relates to a method as well as to a device for registering 2D projection images of an object relative to a 3D image data record of the same object.

BACKGROUND OF THE INVENTION

With specific clinical examinations or treatments there is the need to register 2D projection images, especially x-ray fluoroscopy images, available in real time during the investigation, relative to a previously recorded 3D image data record, to enable the real time flouroscopy images to be overlaid with anatomical image information from the 3D image data record. Examples of such applications are for example minimally invasive investigations or treatments with endoscopes, laparoscopes or catheters, which are introduced into the patient's body via small openings in the body in each case. Catheters are frequently used within the framework of cardiological examinations, for example with arrhythmias of the heart, which are currently treated by what are known as ablation procedures. In such cases a catheter is introduced during the recording of real time x-ray images, so-called fluoroscopy images, via veins or arteries into a heart chamber. In the heart chamber the tissue causing the arrhythmia is ablated by the application of high-frequency current, i.e. left behind as necrotic tissue.

The medical/technical difficulty with such interventions lies in that fact that, although the catheter can be visualized very exactly and at high resolution in the fluoroscopy images during the x-ray checking, the anatomy of the patient is only shown insufficiently in the fluoroscopy images.

In accordance with the method known from US 2003/0220555 A1 it is thus proposed to use a 3D image data record of the investigation area recorded pre-operatively to register the intra-operative 2D fluoroscopy images relative to the 3D image data record, to determine the spatial position and orientation of the catheter tip with reference to the 2D fluoroscopy images and to use this information to include the catheter tip in a presentation of the 3D image data record. The spatial position and orientation of the catheter tip is determined here by back projection from at least two 2D x-ray images, which is relatively simple in this case, since the form and size of the catheter tip is known in advance and this can be recognized very clearly and at high resolution on the fluoroscopy images The precisely-positioned inclusion of the catheter tip in the 3D data record however requires that the 3D image data record as well as the two 2D fluoroscopy images are registered with each other, i.e., that their coordinate systems are correlated to each other via a transformation matrix. To perform this so-called 2D-3D registration various methods known from the prior art are named in the US 2003/0220555 A1. With image-based registration for example an "artificial" projection image is calculated in each case iteratively from the 3D image record and compared to the 2D image fluoroscopy record actually obtained. This process is repeated while varying the angle of projection until such time as a sufficient match between the artificial projection image, the so-called "digitally reconstructed radiogram (DRR)", and the true 2D fluoroscopy image is obtained.

Another 2D-3D registration algorithm uses a landmark-based registration: To this end special anatomical features such as for example the heart surface or specific vessel branching points etc. are used, which are recognizable both in the fluoscopic images and also in the 3D image data record. Further 2D-3D registration algorithms are described are in the Article of J. Weese, T. M. Buzug, G. P. Penney and P. Desmedt "2D/3D Registration and Motion Tracking for Surgical Interventions", Philips J. Res. 51 (1998), pages 299 to 316. In this method too so-called pseudo-projections are calculated from the 3D image data and compared to the x-ray projection images.

These 2D-3D registration algorithms are time-consuming and relatively unstable as a result of their iterative "trial and error" character. This applies especially if the pre-operative 3D image data record has been generated with a different modality to the fluoroscopy images, that is with MR for example, so that the artificially calculated projection image does not necessarily match the measured fluoroscopy image.

DE 102 01 644 A1 discloses a method for registering an intraoperatively recorded 3D image data record with the patient coordinate system, with the 3D image data record having been calculated from a series of projection images recorded for example with a C-arm device. Marker points attached to the patient which are arranged at least partly outside the reconstructable 3D volume are used for the registration. The marker points are however recorded in at least two 2D projection images, on which the 3D image is calculated, and their spatial position is computed with the aid of the known projection geometry. These are related to the marker coordinates in the patient coordinate system. This allows a registration of the 3D image volume to the patient coordinate system. The method requires however, that the 2D projection images used are already registered to the 3D image volume.

SUMMARY OF THE INVENTION

The invention has thus set itself the object of achieving an improved method for registering 2D projection images of an object relative to a 3D image data record which does not exhibit the above-mentioned disadvantages of the 2D-3D registration algorithms.

The invention resolves this problem with the method as well as with the device suitable for executing the method in accordance with the claims. Advantageous embodiments of the invention are specified in the dependent claims in each case.

The invention gets around the above difficulties of 2D-3D registration by spatially reconstructing a target structure contained in the object from at least two 2D projection images of the object which were recorded from different angles. Such a reconstruction which uses only a few projection images, is also referred to as a "symbolic reconstruction". By contrast with the filtered back projection of image data used in C-arm rotation angiography, which were obtained in small steps over at least 180°, a symbolic reconstruction from very few 2D images is only possible if certain characteristics of the image to be reconstructed are predetermined and are used for the reconstruction. In accordance with the invention a model function is used in this case for the form of the target structure to be reconstructed. The reconstructed 3D model of the structure contained in the object, which is identifiable both in the 3D image data record and also in the 2D projection images, is then registered in a so-called 3D-3D registration with the 3D image data record.

Such 3D-3D registrations are known in the prior art and are typically more stable than 2D-3D registration algorithms. The result of the 3D-3D registration can preferably be used to register further 2D projection images of the object from any other projection angles to the 3D image data record of the object and to display the co-registered images jointly on a screen, to allow the doctor a good orientation in the object (e.g. in the investigation area) during a minimally-invasive treatment of the patient for example. This requires the device with which the 2D fluoroscopy images are recorded, e.g. a C-arm x-ray device, to be calibrated, i.e. for the spatial relation to each other of images recorded with different angulations to be known.

Especially advantageously the inventive registration method is repeated after an intentional or unintentional movement of the patient. To this end only two or, if the target structure cannot be satisfactorily reconstructed from these two images, three, four or five 2D fluoroscopy images are recorded with different angulations, the spatial position and orientation of the target structure recognizable on these images symbolically reconstructed and the 3D model thus obtained registered by 3D-3D registration relative to the 3D image data record. From this registration the spatial orientation of the 2D projection images and all further 2D projection images recorded with the same device from the same object/patient for the 3D image data record can then be determined.

The target structure which is spatially reconstructed from the 2D projection images by symbolic reconstruction is also referred to below as the "3D feature". The method in accordance with the invention requires that this feature is to be recognized both in the 2D projection images and also in the 3D image data record. Preferably this involves an anatomical structure such as a characteristic vessel section for example, especially with branches, or a characteristic bone structure. However another organ or another sufficiently clearly delineated structure, such as the ventricle system in the brain is also possible. Advantageously the structure is able to be delineated relatively clearly, extends over a significant part of the 3D image data record and has a layout which is not too complex, which can be reproduced approximately with a simple model function. Quite flat structures such as border areas between organs are suitable for example, which can then be modeled for example by a surface composed of a number of triangles or spherical areas. Furthermore sections of vessels are particularly suitable since these can be approximated as tubes with circular cross-section and variable diameter. Vessels can also be shown very well on x-ray and CT images if contrast means were added before the image is recorded. Contrasted vessel sections are particularly suitable as target structure for the following surgical interventions: For cardiological or electrophysiological interventions of the aortic arc, a coronary sine section or a pulmonary arterial section; for neurological interventions a contrasted carotis section (with branches), for intervention in the abdomen area a contrasted aorta section or a contrasted section of an abdominal vessel.

Alternatively the target structure can involve a non-anatomical structure, such as an implant for example, a screw inserted into a bone or a landmark located outside the body, which can be used for orientation.

Different methods are described in the prior art for the spatial reconstruction of these types of characteristic structure from a few 2D projection images. One method has been implemented for example by Paieon Medical Ltd., Rosh Haa- lyn, Israel and is described on the Internet at www.matimop.org.il/newrdinf/company/c5292.htm. The symbolic reconstruction method described in U.S. Pat. No. 6,047,080 for coronary vessels from angiographic images is also suitable. This method is also knowledge-based and requires the target structure to contain a number of branched vessels. So called "centerlines" are determined from 2D x-ray images for a prespecified number of vessels. An initially two-dimensional tree structure is extracted from these centerlines and the branch points identified. From this information a rotation matrix and a translation vector are determined, which correspond to the relative alignments of the imaging system. This transformation is used to set up a relationship between the vessel centerlines belonging to the different projection images, so that each data point belonging to a projection image is coupled to a data point in the other projection images, so that the coupled data points represent the same location in the vessel of the target structure in each case. From this information a three-dimensional tree can be calculated from the vessel centerlines and a corresponding three-dimensional visual presentation of the target structure constructed, e.g. a graphic reproduction which can be rotated using a cursor on the screen. This method could also be applied to an embodiment of the present invention.

For target structures formed in other ways other symbolic reconstruction methods are possibly more suitable, which include for example a back projection of individual points, of which the spatial position can then be determined at the intersection point of the back projection line.

Different methods can also be employed for the subsequent 3D-3D registration of the spatially reconstructed structure with the 3D image data record. A basic distinction is made here between voxel-based registration methods and feature-based registration methods. The latter methods require that the target structure is also identified in the 3D image data record, so that with 3D-3D registration only the symbolically reconstructed target structure is harmonized with the target structure contained in the 3D image data record. This identification is also referred to as "extraction". Especially preferably in this case a specific characteristic of the target structure, especially the surface or the centerlines of the target structure from the 3D image data record is extracted and compared to the corresponding feature of the target structure reconstructed from the 2D projection images. If surfaces are used for 3D-3D registration, it is not necessary for the two surfaces to be completely 3D reconstructed or extracted from the 3D image data, but instead a subset of the surface points is sufficient. Accordingly a sufficiently good 3D-3D registration is also possible if the target structure can only be relatively roughly symbolically reconstructed from the 2D projection images. Conversely a surface of the target structure represented sparingly through few surface points extracted from the pre-operative 3D image data of the target structure is sufficient for the surface-based 3D-3D registration Instead of the surface extraction mentioned, other features such as landmarks, centerlines etc. can also be extracted from the 3D image data, which are then used for 3D-3D registration.

With so-called voxel-based 3D-3D registration methods not only individually extracted features, but the entire 3D image data record are used. In this case a measure of similarity between the 3D image data record and a three-dimensional data record containing the symbolically reconstructed target structure is calculated and the relative orientation, position and where necessary compression of the two 3D data records to each other is varied until a sufficiently high value for the measure of similarity is obtained. The degree of matching can for example be calculated using the "mutual information" or "normalized mutual information" measure of quality. These measures of quality are known to the person skilled in the art through histograms for gray value distribution. Depending on use, the registration can be a "rigid" registration, or also take account of a change in the form of the object between the recording of the 3D image data record and the 2D fluoroscopy images.

If the object or the examination area is subject to a rhythmic or arrhythmic physiological movement (e.g. through heartbeat, breathing) to achieve an optimum registration in accordance with a preferred embodiment it is ensured that the 3D image data record and the 2D fluoroscopy images are each recorded in the same movement phase. If for example a 3D image data record of the heart was recorded in a breath-holding technique and in a specific heart phase, the 2D projection images for the symbolic reconstruction are recorded in the same breathing phase and at a matching ECG point in time where possible or those of a series of 2D projection images are selected in which the movement state matching the 3D image data record was recorded. This means that both in the recording of the 3D image data record and also of the 2D projection images it is necessary to record the movement phase. The movement phase of the heart can e.g. be recorded by an ECG recorded in parallel. The relevant image data can then be selected on the basis of the ECG. Alternatively the recording of the 2D projection images like that of the 3D image data record can be triggered by the ECG, so that all images are recorded in the same movement phase. It is also conceivable, to record the breathing movement of the patient as the movement phase. This can for example be undertaken using a breathing belt which is laid around the patient's chest and the measures the movement of the chest cavity; Position sensors on the chest of the patient can also be used for the recording. If the 3D image data record has already been created in a specific movement phase, the triggering of the recording of the 2D images is directed in this case towards the phase of the 3D image data record.

The 3D image data record is preferably a data record obtained pre-operatively. Any 3D image data record can be used, independent of recording modality used, such as CT, Computer Tomography Angiography (CTA), Magnetic resonance tomography (MRT), 3D ultrasound, possibly also Positron Emission Tomography (PET). The first-mentioned recording modalities especially allow an anatomically exact and high-resolution presentation of the area to be investigated. The only important factor is that the target structure used in the reconstruction is able to be identified in the 3D image data record.

The invention is also intended for use on a device for executing the registration method described above. This includes an x-ray device which allows 2D projection images to be recorded from different projection angles, a data memory and also computing means for executing the spatial reconstruction and the 3D-3D registration. The x-ray device is preferably a C-arm device. This can be a monoplane device, with which the 2D projection images are recorded with different angulations of the C-arm. Especially preferably an x-ray biplane device is used with which two 2D projection images can be simultaneously recorded in each case. This naturally simplifies the symbolic 3D reconstruction, since the two projection images are guaranteed to be recorded in the same movement state of the object.

BRIEF DESCRIPTION OF THE DRAWINGS

The invention is now explained in more detail below on the basis of exemplary embodiments with reference to the enclosed drawings. In the drawings:

FIG. 1 shows a flowchart of an exemplary embodiment of the method in accordance with the invention;

DETAILED DESCRIPTION OF THE INVENTION

Figure 2A:
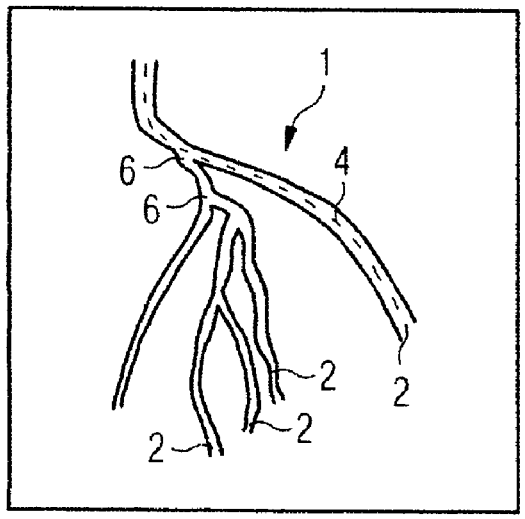
FIGS. 2a, 2b show two typical 2D projection images which show the same vessel tree from two different projection directions.
Figure 2B:
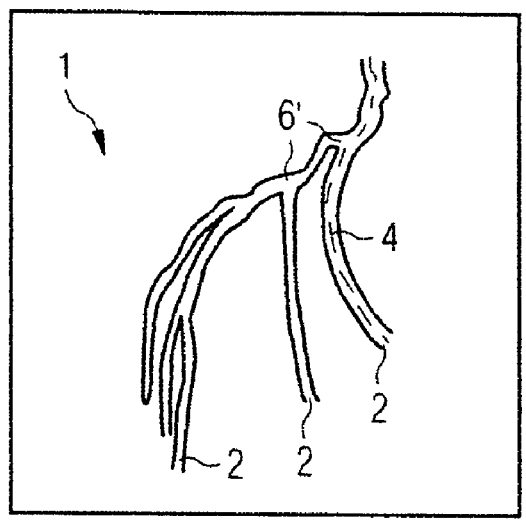

Reference is initially made to FIG. 2 to illustrate the process of symbolic spatial reconstruction using a vessel tree 1 as an example. FIGS. 2a and 2b show the same vessel tree as a 2D projection image from two different projection angles in each case. These images have been recorded for example with the C-arm x-ray device shown in FIG. 3 with different C-arm angulations, with the visibility having being enhanced for example by contrast means injection. The individual vessel arms 2 are thus easy to recognize, and the vessel branches 6 can also be identified. A type of tree structure of this vessel section is thus already able to be identified from FIG. 2a without the precise location of the individual vessel branches in the space being able to be determined. To this end for example each vessel is approximated in each 2D projection image by a "centerline" 4, which is marked as a dotted line in the largest vessel. Furthermore the vessel diameter could also be averaged over the visible vessel length or be extracted at each individual point along the centerline from each of the two Figures FIG. 2a and FIG. 2b. In a next step the positions of the vessel branches 6 are now for example extracted automatically from the individual images and each branch 6 in the image FIG. 2a is assigned to a branch 6' in the image FIG. 2b. This can be done on the basis of the height of the vessel branches in the image (if the angulation direction of the C-arm is known), the diameter of the diverging vessels or on the basis of the tree structure determined. The spatial position of each vessel branch as well as the course of the vessel between the individual branches can then be determined by means of back projection. In this way a three-dimensional model of the vessel structure is obtained which contains the position and orientation of each vessel arm 2 in relation to the geometry of the 2D fluoroscopy images and thereby of the x-ray device used.

The process described above is an example of the method step of the symbolic 3D reconstruction of the 3D features from the >=2 2D fluoroscopy images. The entire sequence of the method in accordance with FIG. 1 will now be described below.

As a first step 30 a pre-operative 3D image data record is recorded. This can be done at any point in time before the planned diagnostic or surgical intervention. Alternatively the 3D image data record can also be acquired directly before the execution of the further method steps on the same x-ray device. In particular C-arm devices also partly allow the recording of three-dimensionally resolved images similar to CT images.

In the next step 32 C the 3D feature (the target structure) needed for 3D-3D registration is extracted from the 3D image data record, a process which can be undertaken using surface, centerline or landmark extraction. This step is only necessary if the 3D-3D registration actually needs an extraction of the 3D feature, which is not the case for example with voxel based registration algorithms. Step 32 can thus optionally be skipped.

Subsequently, in step 34, two or more 2D fluoroscopy images are recorded from different C-arm angulations, in which case the 3D feature to be subsequently reconstructed is easily visible.

Then, in step 36, as explained in greater detail with reference to FIG. 2, the 3D feature of the vessel section for example is symbolically reconstructed, so that its spatial position and orientation relative to the coordinate system of the C-arm system is known (registered).

Step 38 is the actual 3D-3D registration between the 3D feature originating from the pre-operative 3D image data record and the 3D feature which was symbolically reconstructed from the two or more 2D x-ray fluoroscopy images (see step 36).

The result sought, namely the registration of the pre-operative 3D image data (preferably CT/MR) relative to the coordinate system of the C-arm system, is available. This means that the case of a calibrated C-arm x-ray system, a registration of the 3D image data with 2D x-ray fluoroscopy images which are generated from any given angulations of the C-arm system is also provided. The 2D x-ray fluoroscopy images can thus be visualized during an intervention together with the 3D image data with the same orientation and scaling/projection direction (step 40).

This ends the execution sequence of the method. If the registration is no longer optimum during the course of the intervention, e.g. because the patient has moved, the method is repeated, beginning at step 34, in order to update the registration.

Figure 3:
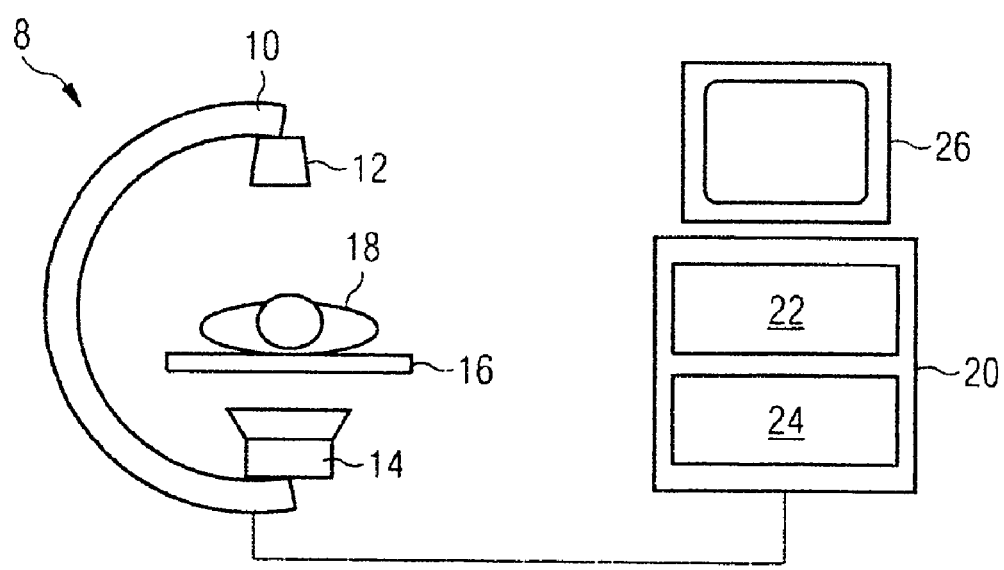
FIG. 3 shows a device for executing the method in accordance with the invention.

FIG. 3 shows an example for a device for executing this method. A significant element of this device is the x-ray device 8 with a C-arm 10, attached to the arms of which are an x-ray tube 12 and an x-ray detector 14. The angular position of the C-arm can be varied (angulated) around a bed 16 with the patient 18 supported on it to obtain fluoroscopy images from different projection directions. The images obtained in this way are forwarded to a control and image evaluation device 20 which comprises at least one data memory 22 and a computing means 24 with a processor or suchlike. The computing means is programmed to spatially reconstruct the 3D feature from the at least two x-ray images and to execute the 3D model thus obtained with the 3D image data record stored in the memory 22. Preferably this process is fully automatic. If necessary the user must specify in advance the type of destination structure (vessel section, bone). The joint visualization of the 2D fluoroscopy images with the pre-operative 3D image data record is reproduced on the screen 26.

A particular application of the method described above lies in also establishing a fixed spatial relationship to the pre-operative 3D image data to further systems as well. This is possible for all systems which for example through their off-line calibration with the C-arm x-ray system have a fixed spatial relationship to the coordinate system of the C-arm x-ray system. Thus for example, after the symbolic reconstruction and the 3D-3D registration, the pre-operative 3D image data can also be used for control of an active instrument such a catheter (e.g. the Niobe system from Stereotaxis). Likewise it is possible to connect the pre-operative 3D image data to the data of localization systems of which the coordinate systems are calibrated relative to the coordinate system of the C-arm x-ray system. Examples of such systems are localization systems for surgery (e.g. CAPPA from CAS Innovations, Erlangen), for, interventional cardiology (e.g. the MPS system from Mediguide, Israel) or the electrophysiological mapping systems. The last-named group includes for example the CARTO system from Biosense Webster, CA, USA and the Ensite-system from Endocardial Solutions, MN, USA, which are used for performing electrophysiological procedures such as ablation for auricular fibrillation.

The present invention describes an approach to a solution for registering 2D projection images, which can be obtained for example during an operation in real time, but containing little anatomical information for pre-operative morphologically detailed 3D image data, which was obtained by CT or MR for example. In this case 2D-3D registration algorithms are not used, but instead the more stable and widely-available 3D-3D registration algorithms. This requires the previous symbolic reconstruction of a target structure from two or more 2D x-ray fluoroscopy images which is also identifiable in the 3D images.

The invention claimed is:

1. A method for registering a plurality of 2D projection images of an object relative to 3D image data record of the object, comprising:
   recording the plurality of 2D projection images of the object from a plurality of projection angles;
   spatially and symbolically reconstructing a 3D model of a target structure of the object by a computing device from the 2D projection images using a model function,
      wherein the 3D model of the target structure is identifiable both in the 3D image data record and in the 2D projection images; and
   registering the 3D model of the target structure relative to the 3D image data record using a 3D-3D registration in which the target structure in the 3D image data record is harmonized with the 3D model of the target structure,
   wherein a relationship is established by the registration between the coordinate system of the 3D image data record and the coordinate system of the 2D projection images.

2. The method as claimed in claim 1, wherein the target structure is first identified in the 3D image data record and is then harmonized with the reconstructed 3D model of the target structure using the 3D-3D registration.

3. The method as claimed in claim 1, wherein a specific feature of the target structure is extracted from the 3D image data record which is harmonized with a corresponding feature of the 3D model during the 3D-3D registration.

4. The method as claimed in claim 3, wherein the specific feature of the target structure is selected from the group consisting of: form, surface, and centerline.

5. The method as claimed in claim 1, wherein the 3D-3D registration is a voxel-based registration using a measure of similarity for a degree of harmonization between the 3D model and the 3D image data record.

6. The method as claimed in claim 1, wherein the object is a part of a human or animal body and the target structure is an anatomical target structure.

7. The method as claimed in claim 6, wherein the anatomical target structure is a section of a vessel or a bone.

8. The method as claimed in claim 1, wherein the 2D projection images are x-ray fluoroscopy images.

9. The method as claimed in claim 1, wherein a result of the 3D-3D registration of the 3D model relative to the 3D image data record is used to register further 2D projection images of the object from any projection angles to the 3D image data record of the object.

10. The method as claimed in claim 1, wherein the steps of recording, spatially reconstructing, and registering are repeated after a movement of the object during a surgical intervention.

11. The method as claimed in claim 1, wherein the object is subject to a periodic movement, and the 2D projection images are recorded in a same movement state of the object in which the 3D image data record was recorded.

12. The method as claimed in claim 11, wherein the periodic movement of the object is breathing or heartbeat.

13. The method as claimed in claim 1, wherein the 3D image data record is recorded prior to the 3D-3D registration by the method selected from the group consisting of: computer tomography, computer tomography angiography, magnetic resonance tomography, 3D ultrasound, and positron emission tomography.

14. The method as claimed in claim 1, wherein the model function is iteratively adapted from the 2D project images until a predetermined match is achieved in the spatial reconstruction of the target structure.

15. The method as claimed in claim 1, wherein the 2D projection images are intra-operatively recorded and the 3D image data record is pre-operatively recorded.

16. A device for registering a plurality of 2D projection images of an object relative to a 3D image data record of the object, comprising:
  an x-ray device for recording a plurality of 2D projection images of the object from a plurality of projection angles;
  a data memory for storing the 2D projection images of the object and the 3D image data record of the object; and
  a computing device for:
    spatially and symbolically reconstructing a 3D model of a target structure of the object from the 2D projection images using a model function that the 3D model of the target structure is identifiable both in the 3D image data record and in the 2D projection images, and
    registering the 3D model of the target structure relative to the 3D image data record using a 3D-3D registration in which the target structure in the 3D image data record is harmonized with the 3D model.

17. The device as claimed in claim 16, wherein an x-ray device is used for recording the 2D projection images.

18. The device as claimed in claim 17, wherein the x-ray device is a C-arm monoplane device and the 2D projection images are fluoroscopy images recorded with a plurality of angulations of the C-arm.

19. The device as claimed in claim 17, wherein the x-ray device is a biplane x-ray device with which two of the 2D projection images are recorded simultaneously.

20. The device as claimed in claim 16, wherein the device comprises a display device for displaying a spatially correlated presentation of the 3D image data record with the 2D projection images of the object.

* * * * *